United States Patent
Winsvold et al.

(10) Patent No.: US 10,142,521 B2
(45) Date of Patent: Nov. 27, 2018

(54) SYSTEM AND METHOD FOR USING HDMI ARC FOR ESTIMATING LATENCY

(71) Applicant: CISCO TECHNOLOGY, INC., San Jose, CA (US)

(72) Inventors: Bjørn Winsvold, Tranby (NO); Lennart Burenius, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/465,806

(22) Filed: Mar. 22, 2017

(65) Prior Publication Data

US 2018/0278811 A1  Sep. 27, 2018

(51) Int. Cl.
*H04N 7/15* (2006.01)
*H04N 7/10* (2006.01)
*H04N 5/067* (2006.01)

(52) U.S. Cl.
CPC .............. *H04N 5/067* (2013.01); *H04N 7/10* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 6,272,441 B1 * | 8/2001 | Peyerl | G01R 27/28 324/76.21 |
| 8,503,669 B2 | 8/2013 | Mao | |
| 8,925,003 B2 | 12/2014 | Goldberg | |
| 2014/0010382 A1 * | 1/2014 | Jeong | G10K 11/16 381/66 |
| 2016/0309213 A1 | 10/2016 | Du et al. | |
| 2017/0006336 A1 | 1/2017 | Lee et al. | |
| 2017/0168772 A1 * | 6/2017 | Lim | G06F 3/165 |
| 2017/0244927 A1 * | 8/2017 | Kim | H04N 5/775 |
| 2017/0245003 A1 * | 8/2017 | Lee | H04N 21/43635 |

FOREIGN PATENT DOCUMENTS

WO    2016060474    4/2016

* cited by examiner

*Primary Examiner* — Joseph J Nguyen
(74) *Attorney, Agent, or Firm* — Polsinelli PC

(57) ABSTRACT

Disclosed is a method that includes receiving an audio video stream, decoding the audio video stream to yield decoded video and decoded audio, transmitting the decoded video on a video cable to a display, transmitting a signal, such as, for example, a signal on an audio channel of the video cable, identifying an impulse response based on a received signal responsive to the transmitting of the signal, identifying a delay amount based on the impulse response and transmitting the decoded audio to a loudspeaker according to the delay amount. The cable can include an HDMI cable with the audio return channel (ARC) capability.

17 Claims, 4 Drawing Sheets

SYSTEM AND METHOD FOR USING HDMI ARC FOR ESTIMATING LATENCY

TECHNICAL FIELD

The present disclosure relates to synchronizing audio and video and more specifically to using HDMI audio return channel to estimate video latency on a viewing screen in a videoconferencing arrangement.

BACKGROUND

When using a TV as a monitor in a videoconferencing arrangement in which the speakers are separate from the TV, the lipsync will not be perfect unless the system knows the video latency introduced by the TV and the delay in the audio. A connected TV will introduce a video stream latency of typically 50-200 ms and a system that uses loudspeakers separate from the connected TV have to delay the audio stream accordingly in order to secure good lipsync. The lipsync failure will be significant and very annoying for the user. Even though there is an optional field in the EDID (extended display identification data) information or the CEC (consumer electronics control) information received from the TV, most of the consumer televisions in the market do not report the video latency. Therefore, this information is not that reliable.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An example method includes receiving an audio video stream, decoding the audio video stream to yield decoded video and decoded audio, transmitting the decoded video on a cable to a display, transmitting a maximum length sequence signal (or any signal) on the cable, identifying an impulse response based on a received signal responsive to the transmitting of the signal, identifying a delay amount and transmitting the decoded audio to a loudspeaker according to the delay amount. The cable can be an HDMI cable and the signal impulse response can be identified through the received signal received on an audio return channel on the cable.

DETAILED DESCRIPTION

The present disclosure addresses the issues raised above. The disclosure provides a system, method and computer-readable storage device embodiments. First a general example system shall be disclosed in FIG. 1 which can provide some basic hardware components making up a server, node or other computer system.

Figure 1:
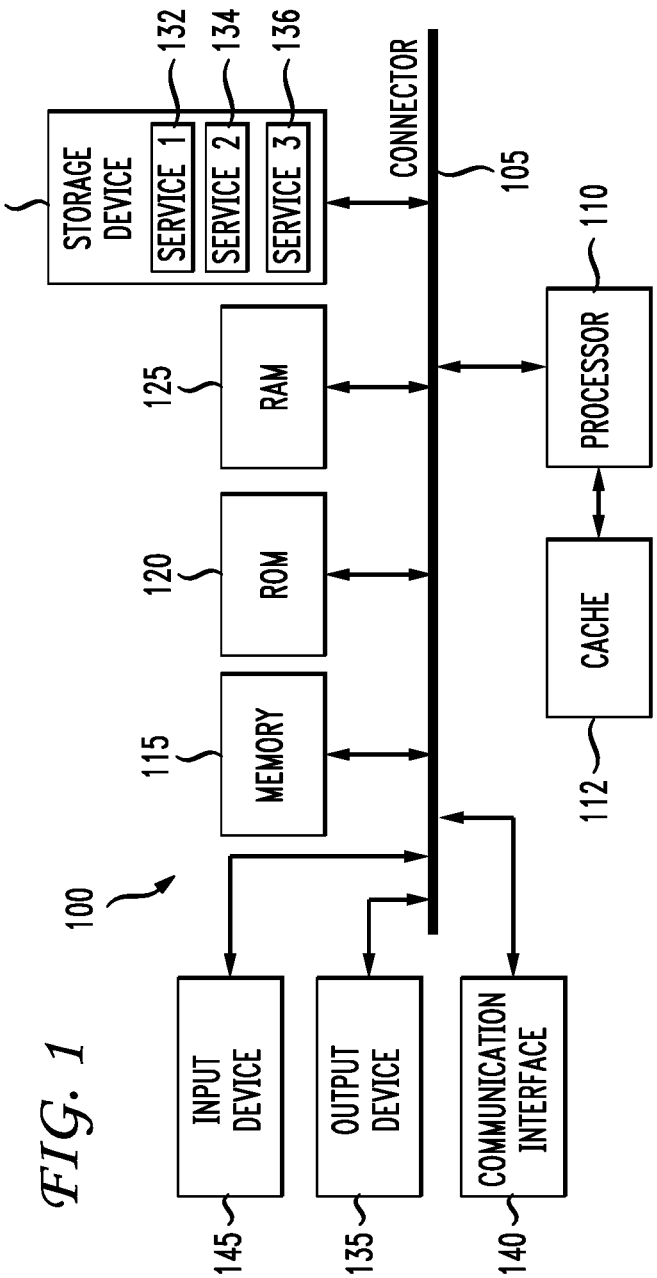
FIG. 1 illustrates an example system configuration.

FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different performance characteristics. The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may essentially be a completely self-contained computing system, containing multiple cores or processors, a bus (connector), memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

Having introduced the basic computing components which can be applicable to embodiments associated with this disclosure, the disclosure now turn to the specific details of the improvements disclosed herein. In an example arrangement, a system can be implemented which uses the "audio return channel" of the HDMI (HDMI ARC) used to measure the audio latency introduced by the TV.

HDMI, which stands for High Definition Multimedia Interface was created as a faster, more efficient way to deliver high quality digital video and audio to and from consumer electronic devices. The interface's current iteration is HDMI 2.0b, a baby step above HDMI 2.0a which now allows for transmission of 4K Ultra HD video with HDR at up to 60 frames per second, as well as the ability to transmit up to 32 channels of audio. A constantly evolving format, HDMI 2.1 set to push the format even further, allowing for transmission of 8K resolution at up to 60 frames per second and 4K content at up to 120 frames per second, equating to faster and more efficient transmission to keep up with the monster file sizes of our video and audio future.

Like previous iterations, the current HDMI 2.0b format is compatible with all older hardware, but the nature of high resolution content means that a user may need to purchase high-speed HDMI cables for best results.

Though many people use HDMI strictly as a means for connecting cable boxes, Blu-ray players, and game consoles to their TV, HDMI can do much more. Besides transferring both video and audio in a single feed, HDMI was also designed to carry what the industry refers to as "handshake" information from one device to another. These shared transmissions were originally intended to communicate basic data for preventing content theft, as well as messages like the status and type of component(s) connected.

But the system was also designed to share more complex messages as a part of what is called Consumer Electronics Control (CEC). CEC allows for a single remote to control features on up to 15 connected devices. There are virtually as many names for CEC as there are electronics brands: Samsung calls it "Anynet +," for instance. Unfortunately, the system has never really lived up to its potential, and is often mistranslated or simply lost between components from different manufacturers. Until the introduction of the ARC.

ARC can simplify the home theater system in two important ways. The first, and perhaps most useful feature ARC brings to the table, is the ability to use one remote for all connected devices' most common functions.

The most common example would be for users who have added a soundbar, HTIB, or other secondary audio device to their TV. As long as both devices are equipped with ARC, simply connecting the component to the TV's ARC HDMI port will allow for control of power, volume, and other features from the TV remote. In most cases, it will also simply transfer TV audio to the unit (e.g., a soundbar like HTIB) automatically without having to deactivate the TV's on-board speakers.

This feature is extremely useful for those who connect gaming consoles, Blu-ray players, set-top boxes, and other devices directly to the TV rather than an audio receiver. It allows for significantly better audio performance for all content than what a TV alone offers, but without having to think about the audio device.

Alternatively, ARC is also handy for other outboard components like streaming devices. Plugging the Chromecast into a TV's ARC port, for instance, may allow a user to automatically switch sources or even turn on the TV when the user clicks the cast icon on his or her phone or tablet. Similar results may be found with other components as well, including Blu-ray players. Other features such as the consumer electronics control feature of HDMI can also be used for providing commands.

In one case, a codec (or any device) is connected to the TV via an HDMI cable. The main video output signal from codec to the TV is transmitted through this cable. The audio does not go through this path, since the device has dedicated built-in speakers. Furthermore, it is assumed that the TV has introduced a certain amount of audio latency in order to match the video latency in the TV. The method disclosed herein measures the latency of the audio path from the device to the TV and back through the HDMI ARC channel by sending a maximum length sequence (MLS) signal (or any signal, such as a low level audio signal that is very difficult to hear) and applying a Hadamard Transformation of the captured ARC signal to find the impulse response (IR) of the system. The IR will give an exact measure of the latency. This latency can then be applied to the audio signal being sent out to the separate loudspeakers of the system. The Hadamard Transformation is applicable in the MLS case. For other signals that can be used, the latency may be found by inspecting the cross-correlation between the sending and the receiving signal or through any other method.

Figure 2:
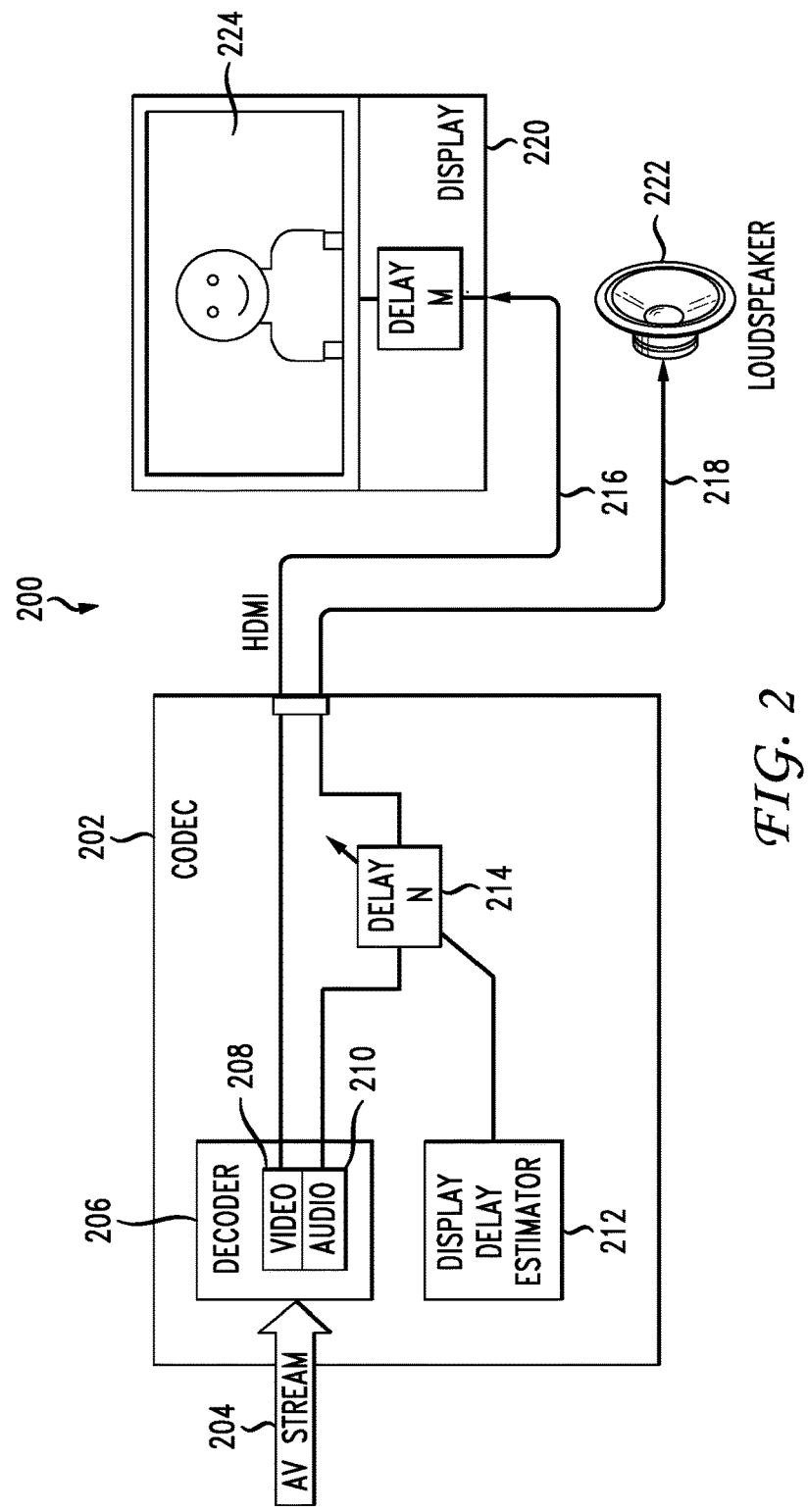
FIG. 2 illustrates an example configuration that includes a display, a codec, and a loudspeaker.

FIG. 2 illustrates an example configuration that includes a display, a codec, and a loudspeaker. As shown in FIG. 2, configuration 200 includes codec 202 that receives an audio/video stream (AV stream 204) from an external source (e.g., a multimedia player, a gaming console, a set-top box, etc.). Decoder 206 can decode AV stream 204 into video signal 208 and audio signal 210. Codec 202 can transmit video signal 208 via cable 216 (e.g. a HDMI cable) to display 220. Video signal 208 can carry content 224 that is ultimately displayed on display 220. Display 220 can be any known and/or to be developed display device capable of displaying audio/visual content such as content 224. As shown in FIG. 2, it is assumed that display 222 has introduced delay M in displaying content 224.

Codec 202 further includes display delay estimator 212, which as will be described below estimates delay M (delay N being an estimate of delay M) introduced by display 220 when displaying content 224. Thereafter, codec 202 delays transmitting audio portion 210 of AV stream 204 to the speaker 222 by the estimated delay N. The speaker 222 can be a soundbar (e.g., the HTIB described above). Cable 218 may be any known or to be developed cable for transmitting audio from codec 202 to speaker 222.

As an alternate, the system could send the audio signal to the TV and receive the delay audio signal back from the TV on the HDMI ARC channel and then send the signal directly to the external speakers. This could result in perfect or near-perfect lipsync. However, the system does not know what the TV will do with the signal that is returned via the HDMI ARC channel. The return signal may actually provide the user with a less desirable experience. In some respects, that approach utilizes the audio from the TV over which the system does not have any control. For example, in some cases, the TV can introduce some kind of compression or expansion of the audio signal which will not give the optimal audio signal quality wanted. Further, the TV may be set in some mode like surround sound which will degrade the audio quality. Some TVs may also send out the signal through the built-in loudspeakers of the TV in addition to the ARC channel. In that case, the distortion in the TV loudspeakers may prevent the acoustic echo canceler in the codec disclosed herein to cancel the echo sufficiently resulting in audible echo sent to the far end. Based on these arguments, the disclosed solution implements the idea in a way that should secure the best possible user experience.

Figure 3:
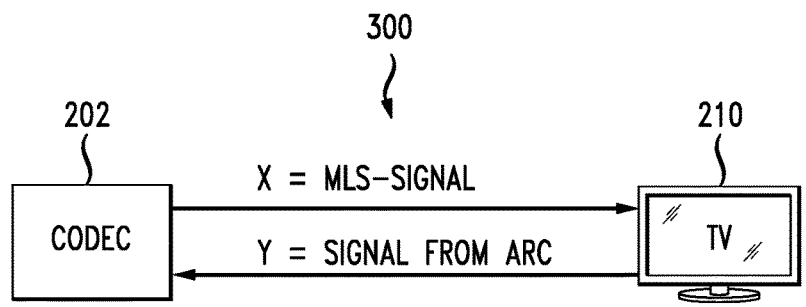
FIG. 3 illustrates an illustration of the signaling between the codec and a TV.
Figure 4:
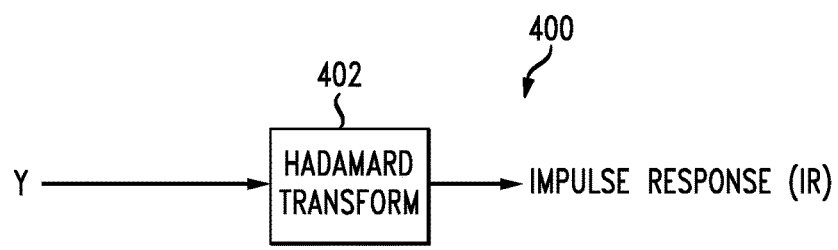
FIG. 4 illustrates the processing of the signal received to yield an impulse response.

FIG. 3 illustrates further the process between the codec 202 and the display (e.g., TV) 220. The overall system 300 enables the codec 202 to send in MLS signal x illustrated in FIG. 3 to the TV 220 (e.g., codec 202 sends the MLS signal x to the TV 220 on the HDMI cable 216 shown in FIG. 2). A signal y is received from the audio return channel of the HDMI cable 216, as is shown. FIG. 4 illustrates the processing 400 of the signal y using a Hadamard Transform 402, to yield an impulse response (IR). The Hadamard Transform is an example of a generalized class of Fourier transforms. Codec 202, as part of performing the Hadamard Transform, performs an orthogonal, symmetric, involutive, linear operation on $2^m$ real numbers (or complex numbers, although the Hadamard matrices themselves are purely real). The Hadamard transform can be regarded as being built out of size-2 discrete Fourier transforms (DFTs), and is in fact equivalent to a multidimensional DFT of size $2\times2\times \ldots \times2\times2$. It decomposes an arbitrary input vector into a superposition of Walsh functions. One of skill in the art will understand the use of the Hadamard Transform to yield the impulse response. Furthermore, any other transform can be utilized as well to identify the impulse response of the system.

Figure 5:
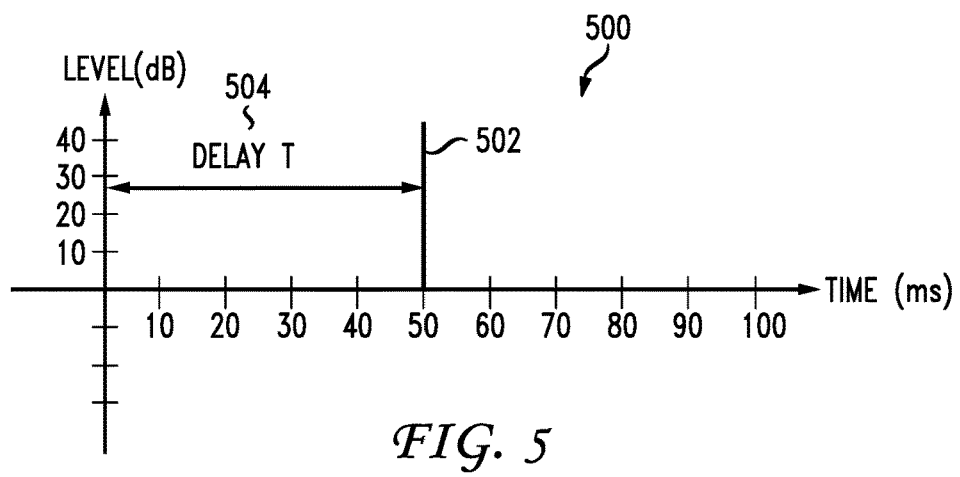
FIG. 5 illustrates identifying the delay using the impulse response.

FIG. 5 illustrates a graph 500 with time on the x axis a dB value on the y axis and showing the impulse response 502. In one example, the delay 504 is identified from the impulse response 502. The delay 504 can be utilized in synchronizing the audio and the video in the manner disclosed herein. Furthermore, other adjustments to the delay time 504 may also be introduced. For example, if there is a known length of cabling or a known distance between the codec 202 and the device 220, such distance may be used to offset or modify the delay 504.

Figure 6:
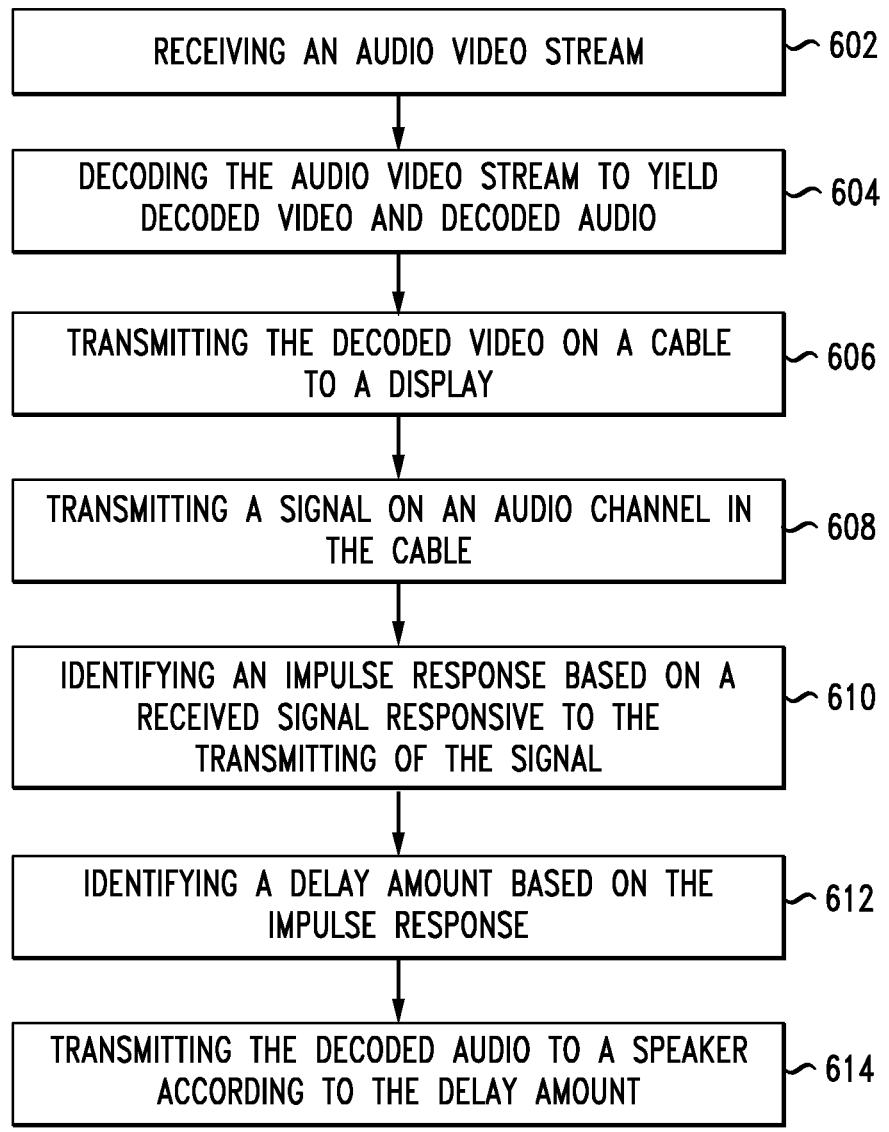
FIG. 6 illustrates a method embodiment.

FIG. 6 illustrates a method embodiment. The method includes receiving an audio video stream (602), decoding the audio video stream to yield decoded video and decoded audio (604), transmitting the decoded video on a cable to a display (606), transmitting a signal, such as, for example, a maximum length sequence signal on an audio channel in the cable (608), identifying an impulse response based on a received signal responsive to the transmitting of the signal (610), identifying a delay amount based on the impulse response (612) and transmitting the decoded audio to a speaker, such as an external speaker, according to the delay amount (614). Any signal can be sent.

Several other features of the method embodiment include identifying the impulse response being based upon applying a Hadamard transformation of a captured or received signal that is responsive to the transmitting of the signal on the audio channel of the cable. The display can be any device such as a television. In one aspect, the cable includes an HDMI cable. In another aspect, identifying the impulse response can be based on the transmitting of the signal is based on use of the audio return channel associated with the cable.

In some embodiments the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
    receiving an audio video stream;
    decoding the audio video stream to yield decoded video and decoded audio;
    transmitting the decoded video on a cable to a display;
    transmitting a signal on an audio channel of the cable to the display;
    receiving a return signal from the display over an audio return channel of the cable responsive to the transmitting a signal;
    identifying an impulse response based on the return signal responsive to the transmitting of the signal;
    identifying a delay amount created by transmitting a signal and receiving the return signal over the cable based on the impulse response; and
    transmitting the decoded audio to a speaker according to the delay amount to synchronize the decoded video and the decoded audio.

2. The method of claim 1, wherein identifying the impulse response is based upon applying a Hadamard transformation of the return signal based on the transmitting of the signal on the audio channel of the cable.

3. The method of claim 1, wherein the display comprises a television.

4. The method of claim 1, wherein the cable comprises an HDMI cable.

5. The method of claim 1, wherein the speaker is independent of the display.

6. The method of claim 1, wherein the signal comprises a maximum length sequence signal.

7. A system comprising:
    at least one processor; and
    a computer-readable storage device instructions which, when executed by the at least one processor, cause the at least one processor to perform operations comprising:
    receiving an audio video stream;
    decoding the audio video stream to yield decoded and decoded audio;
    transmitting the decoded video on a cable to a display;
    transmitting a signal on an audio channel of the cable to the display;
    receiving a return signal from the display over an audio return channel of the cable responsive to transmitting a signal;
    identifying an impulse response based on the return signal responsive to the transmitting of the signal;
    identifying a delay amount created by transmitting a signal and receiving the return signal over the cable based on the impulse response; and
    transmitting the decoded audio to a speaker according to the delay amount to synchronize the decoded video and the decoded audio.

8. The system of claim 7, wherein identifying the impulse response is based upon applying a Hadamard transformation of the return signal based on the transmitting of the signal on the audio channel of the cable.

9. The system of claim 7, wherein the display comprises a television.

10. The system of claim 7, wherein the cable comprises an HDMI cable.

11. The system of claim 7, wherein the speaker is independent of the display.

12. The system of claim 7, wherein the signal comprises a maximum length sequence signal.

13. A non-transitory computer-readable storage device storing instructions which, when executed by at least one processor, cause the at least one processor to perform operations comprising:
    receiving an audio video stream;
    decoding the audio video stream to yield decoded video and decoded audio;
    transmitting the decoded video on a cable to a display;
    transmitting a signal on the cable to the display;
    receiving a return signal from the display over an audio return channel of the cable responsive to the transmitting of a signal;
    identifying an impulse response based on the return signal responsive to the transmitting of the signal;
    identifying a delay amount created by transmitting a signal and receiving the return signal over the cable based on the impulse response; and
    transmitting the decoded audio to a speaker according to the delay amount to synchronize the decoded video and the decoded audio.

14. The non-transitory computer-readable storage device of claim 13, wherein identifying the impulse response is based upon applying a Hadamard transformation of the return signal being responsive to the transmitting of the signal of the cable.

15. The non-transitory computer-readable storage device of claim 13, wherein the display comprises a television.

16. The non-transitory computer-readable storage device of claim 13, wherein the cable comprises an HDMI cable.

17. The non-transitory computer-readable storage device of claim 13, wherein the speaker is independent of the display.

* * * * *